US010886537B2

(12) United States Patent
Amatucci et al.

(10) Patent No.: US 10,886,537 B2
(45) Date of Patent: Jan. 5, 2021

(54) ELECTROCHEMICAL DEVICES AND METHODS FOR MAKING SAME

(71) Applicant: Rutgers, The State University of New Jersey, New Brunswick, NJ (US)

(72) Inventors: Glenn G. Amatucci, Peapack, NJ (US); Anna B. Halajko, Parlin, NJ (US); Linda Wu Sung, Morris Plains, NJ (US)

(73) Assignee: Rutgers. The State University of New Jersey, New Brunswick, NJ (US)

( * ) Notice: Subject to any disclaimer, the term of this patent is extended or adjusted under 35 U.S.C. 154(b) by 171 days.

(21) Appl. No.: 16/091,198

(22) PCT Filed: Apr. 6, 2017

(86) PCT No.: PCT/US2017/026349
§ 371 (c)(1),
(2) Date: Oct. 4, 2018

(87) PCT Pub. No.: WO2017/176996
PCT Pub. Date: Oct. 12, 2017

(65) Prior Publication Data
US 2019/0267634 A1    Aug. 29, 2019

Related U.S. Application Data

(60) Provisional application No. 62/319,622, filed on Apr. 7, 2016.

(51) Int. Cl.
*H01M 4/80* (2006.01)
*H01M 4/134* (2010.01)
(Continued)

(52) U.S. Cl.
CPC ............. *H01M 4/80* (2013.01); *H01M 4/134* (2013.01); *H01M 4/667* (2013.01); *H01M 10/0525* (2013.01)

(58) Field of Classification Search
CPC ........ H01M 4/74; H01M 4/742; H01M 4/745; H01M 4/667
See application file for complete search history.

(56) References Cited

U.S. PATENT DOCUMENTS 6,051,117 A    4/2000  Novack et al.
2008/0318125 A1*  12/2008  Sakamoto ............... H01M 4/32
                                                                              429/223
(Continued)

OTHER PUBLICATIONS

International Search Report and Written Opinion dated Jun. 27, 2017, issued by the U.S. Patent and Trademark Office in International Application No. PCT/US17/26349 (14 pages).

*Primary Examiner* — Alix E Eggerding
(74) *Attorney, Agent, or Firm* — Greenberg Traurig, LLP (57) ABSTRACT

A current collector for use in an electrochemical cell is provided. The current collector comprises: a reticulated core comprising a polymer and having continuous porosity; a first reticulated surface; a second reticulated surface opposite said first reticulated surface; and a thin metal film disposed on at least one of said first and second reticulated surfaces, wherein said current collector has continuous porosity. A high temperature resistant polymer is preferred for the reticulated core where the current collector may be exposed to high temperatures during production or use. The continuous porosity of the reticulated core 12 and the current collector allows for passage of electrolyte and ions, as necessary for operation of an electrochemical device that includes the current collector. Various methods for making the current collector are also provided, including an exemplary embodiment in which a reticulated core comprising a polymer is provided and a thin metal film is deposited on at least one of the first or second reticulated surface of the reticulated core to form the current collector. An electrode assembly which includes the current collector, as well as an (Continued)

electrochemical cell which includes at least one current collector, are also provided.

24 Claims, 3 Drawing Sheets

(51) Int. Cl.
*H01M 4/66* (2006.01)
*H01M 10/0525* (2010.01)

(56) References Cited

U.S. PATENT DOCUMENTS

| | | |
|---|---|---|
| 2011/0070489 A1 | 3/2011 | Chiang et al. |
| 2011/0262813 A1* | 10/2011 | Jung .................. H01M 4/68 |
| | | 429/245 |
| 2014/0205902 A1 | 7/2014 | Zhao et al. |
| 2014/0329126 A1 | 11/2014 | Ho et al. |

* cited by examiner

ELECTROCHEMICAL DEVICES AND METHODS FOR MAKING SAME

CROSS-REFERENCE TO RELATED APPLICATIONS

This application is a § 371 national phase application of and claims priority to International Patent Application No. PCT/US2017/026349 filed Apr. 6, 2017 which in turn claims the benefit of U.S. Provisional Patent Application No. 62/319,622, filed Apr. 7, 2016, the disclosures of which are incorporated by reference in their entireties herein for all purposes.

STATEMENT OF GOVERNMENT FUNDING

This invention was made with government support under a contract from the US Government. The United States government has certain rights in the invention.

FIELD OF THE INVENTION

The present invention relates generally to electrochemical cells and, more specifically to current collectors having a reticulated structure for use in electrochemical cells and a method for making such current collectors.

BACKGROUND OF THE INVENTION

There continues to be great demand for efficient and long-lasting electrochemical energy storage systems. Electrochemical cells are the most basic electrochemical energy storage unit. Electrochemical devices such as batteries or capacitors may include a single electrochemical cell or multiple electrochemical cells, depending on their intended use. Electrochemical cells all have certain basic components including, but not limited to, a positive electrode, a negative electrode, electrolyte, a separator between the positive and negative electrodes, and at least two current collectors each of which is in contact with either the positive or negative electrode. The aforesaid functional components may be wound or stacked together to form an operational electrochemical cell, which is often enclosed or contained within a hermetic or nearly hermetic packaging or case to separate and protect the functional components from ambient conditions including moisture, oxygen, and contact with other materials.

Current collectors facilitate the flow of electric current to and from the positive and negative electrodes during operation of the electrochemical cell. More specifically, a current collector collects electrons from its associated electrode and facilitates their transfer to an external lead (e.g., tab) that extends to outside the packaging of the electrochemical cell to an external circuit. Tabs are typically connected to, or extend from, each of the current collectors and protrude externally from the electrochemical cell. Tabs are often made of the same material as the current collectors, or another electrically conductive material, and provide points of electrical attachment to the positive and negative electrodes of an electrochemical cell. For example, an electrochemical cell may be electrically attached, by its tabs, to one or more other electrochemical cells, such as in a battery or capacitor, or to an electronically operated device such as a light, a machine, a circuit, or any number of other such devices.

Since an electrode can be of considerable length from the external tab to the internal functional components, it is important that the current collector associated therewith is not only of exceptional electronic conductivity, but also creates a low impedance connection with the electrode itself. Throughout history this has been accomplished through the use of current collectors made of metals due to their well-known highly conductive properties. However, while, metal current collectors offer exceptional electronic properties, there exist a few important properties where the ability of metal current collectors fall short. These important properties include, but are not limited to, weight, cost, strength, electrochemical stability, and flexibility. Generally, metals tend to be expensive and heavy. Furthermore, a particular issue exists with regard to metal strength and flexibility. It is well known that repeated flexing of metal foils, regardless of their initial modulus, eventually results in the immobilization of dislocation movement. This is known as "work hardening" of the metal and will sometimes lead to mechanical failure of metal current collectors, which of course, renders the entire electrochemical cell nonfunctional. Formation of a strong connection or adherence between metal current collectors and the electrodes has also been an issue and adhesives are sometimes used to address this, to varying degrees of success. Failure of the connection between a current collector and its associated electrode will often result in the failure of the electrochemical device containing the electrochemical cell in which such failure occurs. Thus, use of bulk metals for current collectors has its shortcomings.

Pure carbon current collectors, which would be both less expensive and lighter than metal current collectors, have been used in an attempt to resolve the aforesaid issues presented by metal current collectors, however, volumetrically such conductors have fallen short. Even the most advanced forms of graphene and carbon nanotubes have not been shown to possess practically implementable structures of high enough electronic conductivity and stability per volume to compete with metal.

It is believed that the current collectors of the present invention overcome many of the aforementioned shortcomings of conventional metal current collectors.

SUMMARY OF THE INVENTION

This disclosure provides an exemplary embodiment of a current collector for use in an electrochemical cell. More particularly, the current collector comprises: a reticulated core comprising a polymer and having continuous porosity; a first reticulated surface; a second reticulated surface opposite said first reticulated surface; and a thin metal film disposed on at least one of said first and second reticulated surfaces, wherein said current collector has continuous porosity. The polymer may be one or more polymers selected from the group consisting of: polyolefin, polyimide, polyamide, poly(p-xylylene), silicone-containing polymer, poly (ethylene terephthalate), polyvinylidene fluoride, and copolymers thereof. In some embodiments, high temperature resistant polymer is preferred. The thin metal film may comprise one or more metals selected from the group consisting of: C, Be, Al, Ti, V, Cr, Fe, Ni, Cu, Zn, Zr, Nb, Ta, W, Au, Pd, Pt, Mo, Ag, Cu, Ni, and Zn.

Other exemplary embodiments provided include an electrode assembly and an electrochemical cell stack, each of which includes the current collector.

This disclosure also provides an exemplary embodiment of a method for making the aforesaid current collector in which a non-porous core is provided which comprises said polymer and has a first surface and a second surface opposite said first surface; a thin metal film is deposited on at least one of said first or second surfaces of said non-porous core to form a metallized core substrate having first and second surfaces; a plurality of pores is formed in the metallized core substrate using a technique that creates the reticulated core having continuous porosity and converting the first and second surfaces of the metallized core substrate to first and second reticulated surfaces, respectively, of the current collector.

In another exemplary embodiment, a method for making the aforesaid current collector comprises: providing the reticulated core which comprises said polymer and has continuous porosity, the first reticulated surface, and the second reticulated surface opposite the first reticulated surface, followed by depositing the thin metal film on at least one of the first and second reticulated surfaces of the reticulated core to form the current collector. In some embodiments, the step of providing the reticulated core further comprises the steps of: providing a non-porous core comprising the polymer having a first surface and a second surface opposite said first surface; and forming a plurality of pores in the non-porous core using a technique which forms the reticulated core having continuous porosity from the non-porous core, and converts said first and second surfaces of the non-porous core to the first and second reticulated surfaces, respectively, of the reticulated core.

BRIEF DESCRIPTION OF THE DRAWINGS

For a more complete understanding of the present invention, reference is made to the following detailed description of exemplary embodiments considered in conjunction with the accompanying drawings, in which like structures are referred to by like numerals throughout the several views, and in which.

DETAILED DESCRIPTION OF THE INVENTION

The present invention relates generally to a current collector of exceptional flexibility, strength, and light weight for use in electrochemical cells. More particularly, the current collector has a reticulated core made of polymer with a thin metal film on one or both sides of the core. A high temperature resistant polymer is preferred for the reticulated core where the current collector may be exposed to high temperatures during production or use. While it is believed that the current collectors contemplated and described herein are suitable for use with electrochemical devices of virtually all chemistries and designs, it is also believed that they will be particularly beneficial when employed in lithium-based electrochemical devices (i.e., those that contain lithium or lithium ions in the electrolyte and at least one of the positive or negative electrodes), and particularly with pouch-type lithium-based electrochemical cells.

Figure 1:
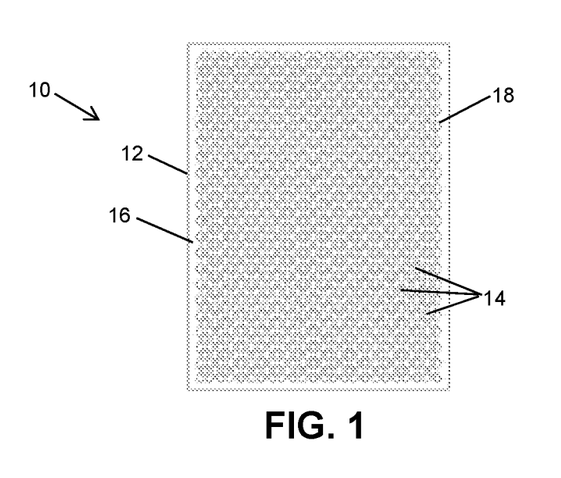
FIG. 1 is a schematic front view of an embodiment of a current collector in accordance with the present invention.

FIG. 1 shows the schematic front view of one exemplary embodiment of a current collector 10 as contemplated and described herein. More particularly, the current collector 10 includes a reticulated core 12 comprising a polymer and having pores 14. As will become clearer hereinafter, due to the structure of the current collector 10 and its components, the current collector 10 has the same pores 14 as the reticulated core 12. The current collector 10 also has a first reticulated surface 16 and a second reticulated surface (not visible in FIG. 1) which is opposite the first reticulated surface 16.

Moreover, the current collector 10 and the reticulated core 12 both have continuous porosity which means that the pores 14 are at least partially interconnected, such that they form passageways that pass entirely through the thickness of the reticulated core 12 (i.e., from a first surface to a second surface thereof, which are not shown per se) and, likewise, through the entire thickness of the current collector 10 (i.e., from the first reticulated surface 16 to the second reticulated surface (not visible in FIG. 1)). The continuous porosity of the reticulated core 12 and the current collector 10 allows for passage therethrough of electrolyte and ions, as necessary for operation of an electrochemical device that includes the current collector 10.

Additionally, a thin metal film 18 is disposed on at least one of the first and second reticulated surfaces 16 of the current collector 10. In the embodiment shown in FIG. 1, the thin metal film 18 is disposed on the first reticulated surface 16. In other embodiments, the thin metal film 18 may be disposed only on the second reticulated surface (not visible), or thin metal films may be disposed on each of the first and second reticulated surfaces 16 of the current collector 10. The thin metal film 18 has a pattern that matches the reticulate pattern of the surface on which it is disposed so as not to obstruct the pores 14.

The polymer of the reticulated core 12 may be any polymer that is electrochemically stable within the electrochemical environment of the electrochemical cell. For example, without limitation, suitable polymers include one or more polymers selected from polyolefin, polyimide, polyamide, poly(p-xylylene), silicone-containing polymer (such as polydimethylsiloxane), polyvinylidene fluoride, and poly(ethylene terephthalate). Poly(p-xylylene) polymers are, for example, commercially available from Specialty Coating Systems of Indianapolis, Ind., U.S.A, under the tradename PARYLENE®. Polyimide polymers are, for example, commercially available from E. I. du Pont de Nemours and Company of Wilmington, Del., U.S.A., under the tradename KAPTON®. The polymers may be copolymers, i.e., comprising more than one type of monomer or polymer. Polymers are known to be intrinsically flexible and not to suffer from the work hardening effects and weakness possessed by bulk metal materials. In some embodiments, such as when the current collector will be exposed to high temperatures, e.g., during fabrication processes or in use, the polymer should be selected from one or more high temperature resistant polymers including, without limitation, polyimide (e.g., KAPTON®), and poly(p-xylylene) (e.g.) PARYLENE®). For instance, during the fabrication of lithium-based pouch type electrochemical cells, temperatures of up to 120° C., or even higher, are typically applied, such as during the sealing of the hermetic packaging to the tabs. In such cases, one or more high temperature resistant polymers should be selected for the reticulated core 12. Other considerations for selection of the polymer for the reticulated core 12, as will be understood by persons of ordinary skill include, without limitation, required mechanical properties, method of metallization, and also method of cell fabrication. For example, lithium-based electrochemical cells requiring extreme mechanical deformation or stretchability would be best addressed by selecting lower modulus polymers such as silicones, or lower molecular weight polyolefins. Additionally, in some embodiments, the reticulated core 12 may further comprise a carbon filler. Various forms of carbon filler are suitable, including without limitation, graphite, carbon nano-tubes, carbon black, graphene, and any combination thereof.

The reticulated core 12 generally has a thickness of from about 1 to about 250 microns. For example without limitation, in some embodiments, the reticulated core 12 may have a thickness of from about 1 to about 150 microns, or from about 1 to about 100 microns or from 1 to about 50 microns, or even from about 1 to about 25 microns. Furthermore, in some embodiments the thickness of the reticulated core 12 may be, for example without limitation, from about 5 to about 250 microns, or from about 5 to about 150 microns, or from about 5 to about 100 microns, or from about 5 to about 50 microns, or from about 5 to about 25 microns, for from about 7 to about 250 microns, or from about 7 to about 150 microns, or from about 7 to about 100 microns, or from about 7 to about 50 microns, or even from about 7 to about 25 microns.

As shown in FIG. 1, the pores 14 of the reticulated core 12 form reticulate patterns on the first and second reticulated surfaces 16 of the current collector 10. The pores 14 may be of any desired shape or combination of shapes such as for example, without limitation, rectangle, square, diamond, triangle, circle, hexagon, octagon, and trapezoid. Furthermore, while the pores 14 need not all be the same size or shape, in practice that is often the configuration employed given current processing techniques and the presumed efficiency of uniform porosity. Typically, the pores 14 will have openings of from about 1 to about 5,000 microns in width. For example, without limitation, the pores 14 may have openings of from about 1 to about 3,000 microns, or from about 1 to about 2,000 microns, or from about 100 to about 5,000 microns, or from about 250 to about 5,000 microns, or from about 500 to about 5,000 microns, or from about 100 to about 3,000, or from about 100 to about 2,000 microns, or from about 250 to about 3,000 microns, or from about 500 to about 3,000 microns, or even from about 500 to about 2,000 microns. Generally, as will be understood by persons of ordinary skill, the size and shape of the pores should be selected to be large enough to accommodate a flow of electrolyte and ions through the pores such that the ionic current is not impeded, to provide the additional weight and volume reduction required, and to enhance the degree of flexibility required.

There are various techniques known and available for forming a reticulated core 12 that is suitable for use in the current collector 10 according to the embodiments contemplated and described herein. For example, in some embodiments, a reticulated core 12 may be formed already having pores 14, such as by a molding process (e.g., injection, extrusion, compression, etc.), such as are well known to persons of ordinary skill in the relevant art. Such reticulated cores would have first and second reticulated surfaces ready for deposition of the thin metal film 18 on one or both such surfaces to form the first and second reticulated surfaces 16 of the current collector 10. In other embodiments, a non-porous polymer core (i.e., not reticulated, but not shown) may first be obtained and then subjected to one or more pore forming techniques to obtain the reticulated core 12 suitable for use in the current collector 10. Suitable pore forming techniques are generally well known to persons of ordinary skill in the art and include cutting techniques such as, without limitation, computer controlled micro laser machining, high speed milling, water jet cutting, electrical discharge machining, and die cutting. It is generally within the ability of persons of ordinary skill in the relevant art to select which methods and techniques to use for obtaining the reticulated core 12.

As already mentioned, a thin metal film 18 is disposed on at least one of the first and second reticulated surfaces 16 of the current collector 10. Each thin metal film 18 comprises one or more electronically conductive metals. The electronically conductive metal used for each thin metal film 18 is selected based on the chemistry of the electrochemical cell and the electrochemical environment (potential, temperature, contaminants, etc.) in which the current collector 10 is intended for use as well as whether the current collector 10 will be in contact with a positive or negative electrode (as discussed hereinbelow).

Selection of appropriate metals for the thin metal film 18 is within the general knowledge and ability of persons of ordinary skill in the relevant art. Generally, the selection of appropriate metal for the thin metal film 18 will be guided by the chemistry and design of the electrochemical cell in which the current collector 10 will be used. Types of bulk metals typically used to make conventional current collectors are also generally suitable for the thin metal film 18 of the present current collectors 10. The combination of the intrinsic conductivity of the selected metal and its applied thickness on the reticulated core 12 must be sufficient to enable electrochemical reactions of the electrochemical cell to be performed at a rate sufficient for performance in its intended application. For example, where the current collector 10 will be used in a lithium-based electrochemical cell, then suitable metals include, without limitation, C, Be, Al, Ti, V, Cr, Fe, Ni, Cu, Zn, Zr, Nb, Ta, W, Au, Pd, Pt, Mo, Ag, Cu, Ni, and Zn. Moreover, alloys of Ni, Ti, Cu, and Pt—Rh, as well as stainless steel, silicon carbide (SiC), titanium nitride (TiN), zirconium nitride (ZrN), zinc oxide (ZnO), tin oxide (SnO or $SnO_2$), and tin oxide doped with indium or fluoride are also suitable materials for making the thin metal film 18 of the present current collectors 10.

More particularly, as will be recognized by persons of ordinary skill, where the current collector 10 will be assembled with a positive electrode in a lithium-based electrochemical cell, the thin metal film 18 may comprise, for example, without limitation, one or more metals selected from C, Be, Al, Ti, V, Cr, Fe, Ni, Cu, Zn, Zr, Nb, Ta, W, Au, Pd, Pt, Mo, and Ag. In such positive electrodes, the thin metal film 18 of the current collector 10 may be made of alloys of Ni, Ti, Cu, and Pt—Rh, as well as stainless steel, silicon carbide (SiC), titanium nitride (TiN), zirconium nitride (ZrN), zinc oxide (ZnO), tin oxide (SnO or $SnO_2$), and tin oxide doped with indium or fluoride. (For discussions concerning suitable materials for use in positive current collectors for lithium-based batteries, see for example without limitation, Whitehead, A. H., et al., "Current Collectors for Positive Electrodes of Lithium-Based Batteries," J. of the Electrochemical Soc., 152 (11), (2005), pp. A2105-A2113, and Iwakura, C. I., et al., "Electrochemical characterization of various metal foils as a current collector of positive electrode for rechargeable lithium batteries," J. of Power Sources, 68 (1997), pp. 301-303). Where the current collector 10 will be assembled with a negative electrode in a lithium-based electrochemical cell, the thin metal film 18 may, for example without limitation, comprise one or more metals selected from Al, Ti, Au, Pd, Pt, Ag, Cu, Ni, and Zn.

Each thin metal film 18, independently, has a thickness of from about 25 to about 5,000 nanometers (nm). For example, in some embodiments, the thin metal films 18 may each, independently, be from about 25 to about 3000 nm, or from about 50 to about 3,000 nm, or from about 100 to about 3,000 nm, or from about 100 to about 2,000 nm, or from about 100 to about 5,000 nm, or even from about 50 to about 5,000 nm. Such thin metal films have mechanical properties known to be superior to their bulk metal counterparts in their resistance to work hardening and are utilized with regularity in the electronics industry.

Suitable metallization techniques for disposing the thin metal film 18 on to the first or second reticulated surfaces 16 of the current collector 10, or both, may be any metal deposition techniques known now or in the future to persons of ordinary skill in the relevant art. Such techniques include, without limitation, physical vapor deposition (including thermal vacuum evaporation, sputtering, electron beam evaporation, chemical vapor deposition, etc.), plasma spray, electrodeposition, or any combination thereof.

The use of a thin metal film 18 on the current collector 10 enables the wider use of more precious metals (such as Au, Pd) with exceptionally high electronic conductivity and stability in extreme electrochemical environments. The latter include exceptionally high voltages, electrolytes with non-protective properties, and extreme environments. The thin metal film 18 enables the production of a highly functional current collector 10 with at least an order of magnitude decrease in volume of metal required. Also, the combination of a thin metal film 18 with the reticulated core 12 and first and second reticulated surfaces 16 for the current collector 10 contemplated and described herein impart improved mechanical properties to the current collector 10 and allow for flexing in all dimensions relative to the limited flexibility of non-reticulated structures. Furthermore, the embedded current collector 10 within the electrode 20 assembly enables significant structural cohesiveness with the electrode 20 upon mechanical translation as compared to a simple coated polymer foil.

It is noted that the thin metal film 18 may be deposited on the core 12 either before or after formation of the pores 14. More particularly, in embodiments where the reticulated core 12 is formed using a technique that produces a reticulated core 12 already having pores 14 and first and second reticulated surfaces, the thin metal film 18 is deposited onto the either the first or second reticulated surfaces 16 of the reticulated core 12, or both, in a pattern that matches the reticulate pattern of the surface or surfaces onto which it is being deposited. In embodiments where a non-porous core, i.e., not having pores and continuous porosity (not shown), is obtained first, the thin metal film 18 may be deposited onto one or both surfaces of the core before or after formation of pores that pass completely through the core, i.e, from one surface to the opposite surface thereof. More particularly, where such a non-porous core is first obtained, in some embodiments, the thin metal film 18 may be deposited on one or both surfaces of the non-porous core. After such deposition of the thin metal film 18, the pores are then formed using a suitable technique, as described above, to produce a current collector 10 comprising a reticulated core 12 and having first and second reticulated surfaces 16 and a thin metal film 18 disposed on at least one of those surfaces. Alternatively, in other embodiments where a non-porous core is first obtained, pores 14 may first be formed in the core using a suitable technique, as described above, to produce a reticulated core 12 having first and second reticulated surfaces (not shown per se). After formation of the pores 14, the thin metal film 18 is deposited on one or both of the reticulated surfaces of the reticulated core 12 to produce the current collector 10 having first and second reticulated surfaces 16 and a thin metal film 18 disposed on at least one such surface. It is well within the ability of persons of ordinary skill in the relevant art to decide in what order to perform the various production steps in accordance with the method contemplated and described herein, as well as to select which techniques to use to form the pores 14 and deposit the thin metal film 18.

The first and second reticulated surfaces 16 of the current collector 10 each, independently, have a surface porosity of from about 5 percent (%) to about 80%. As readily understood by persons of ordinary skill in the relevant art, surface porosity generally means the percentage of total area that is occupied by pore openings. This provides a measure of how much of the surface area is open and available for flow into or through the reticulated core 12, such as by electrode material, ions, or electrolyte. Surface porosity is calculated by dividing the total open surface area (i.e., the sum of the areas of all pore openings) by the total area of the whole surface, then multiplying the resulting quotient by 100. For example, if the first reticulated surface 16 of the current collector 10 shown in FIG. 1 was 30 millimeters (mm) in width by 40 mm in length, then the total surface area would be 1200 square millimeters ($mm^2$). Then, if the first reticulated surface 16 had 660 pores 14 and each of them had an open area of 1.2 $mm^2$, then the total open area provided by the pores 14 would be 792 $mm^2$. These dimensions would provide a surface porosity of about 66% (i.e., [792÷1200]× 100). In some embodiments, for instance, the first and second reticulated surfaces 16, independently, each have a surface porosity of from about 10% to about 80%, or from about 20 to about 80%, or from about 25% to about 80%, or from about 10% to about 70%, or from about 20% to about 70%, or from about 25% to about 70%, or from about 25% to about 70%, or from about 10% to about 50%, or from about 20% to about 50%, or even from about 25% to about 50%.

As described above, various methods are suitable for forming the current collectors contemplated and described herein. In an exemplary embodiment, a method for making a current collector in accordance with the embodiments contemplated and described herein comprises the steps of:

providing a polymer core having a first surface and a second surface opposite the first surface; depositing a thin metal film on at least one of the first or second surfaces of the polymer core to form a metallized core substrate having first and second surfaces; and forming the pores in the metallized core substrate using a technique that creates the reticulated core and the first and second reticulated surfaces of the current collector. Suitable techniques for depositing the thin metal film and forming the pores have been previously described above.

In another exemplary embodiment, a method for making a current collector in accordance with the embodiments contemplated and described herein comprises the steps of: providing a reticulated core having a first reticulated surface and a second reticulated surface opposite the first reticulated surface; and depositing the thin metal film on at least one of the first or second reticulated surfaces of the reticulated core. In such embodiments as this, the step of providing a reticulated core may comprise providing a reticulated core comprising polymer and already having pores that provide continuous porosity as described above. Alternatively, the step of providing the reticulated core may comprise: providing a non-porous core comprising polymer and having a first surface and a second surface opposite the first surface; and forming pores in the non-porous core, either before or after depositing a thin metal film on at least one of the first and second surfaces of the non-porous core. Where the pores are formed before metal film deposition, forming the pores creates a reticulated core having continuous porosity and first and second reticulated surfaces, upon which the metal film may then be deposited. Where the pores are formed after metal film deposition on the non-porous core, forming the pores creates the current collector having continuous porosity and first and second reticulated surfaces.

Figure 2A:
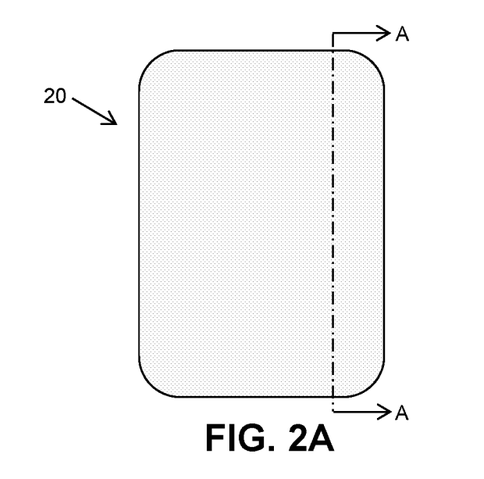
FIG. 2A is a schematic front view of one embodiment of an electrode which includes the current collector of FIG. 1 integrated therein.
Figure 2B:
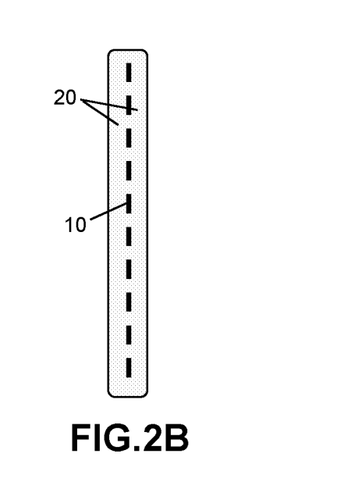
FIG. 2B is a schematic cross-sectional left side view of the electrode of FIG. 2A, taken along line A-A and looking in the direction of the arrows, showing the position of the current collector integrated within the electrode.

With reference now to FIGS. 2A and 2B, schematic front and left side views of an electrode 20 are provided. The electrode 20 includes a current collector 10 (the dashed line) in electrical contact therewith, in accordance with the above description and embodiments. The electrode 20 may be a positive or a negative electrode. The electrode may also be non-porous or porous. In some embodiments, for example, the electrode 20 has continuous porosity, i.e., the pores of the electrode are at least partially interconnected such that they form passageways that pass entirely through the thickness of the electrode 20, from one surface to an opposite surface (not indicated per se in FIGS. 2A and 2B), for passage therethrough of electrolyte and ions, as well as through the electrode 20 and through the current collector 10. The rear view of the current collector 10 is not shown, per se, but is a mirror image of the view provided in FIG. 2A.

More particularly, FIG. 2B provides a schematic cross-sectional left side view of the electrode of FIG. 2A, taken along line A-A and looking in the direction of the arrows, showing the position of the current collector 10 integrated within the electrode 20. As shown in FIG. 2B, the current collector 10 is in electrical contact with the electrode 20 and may be positioned wholly within the electrode 20. In some preferred embodiments, the current collector 10 is at least partially embedded or integrated within the material of the electrode 20. This may be accomplished by any method known, either now or in the future, to persons of ordinary skill in the art, for example using heat and pressure after assembling and orienting a current collector 10 in contact with the electrode material suitable for use as the electrode 20. For example, electrode material in the form of sheets, monoliths, pieces, particulates, or powder may be positioned on either side of the current collector 10, i.e., adjacent to and in contact with the surfaces of the current collector 10. Next, the entire assembly of materials may then be subjected to increased temperature and pressure sufficient to cause electrode material to enter and solidify at least partially in the pores 14 of the current collector 10. Thus, the current collector 10 and electrode 20 are at least partially fused or integrated together, which forms a strong and secure attachment between them. In embodiments where the current collector 10 and electrode 20 are at least partially fused or integrated together, there will be regions proximate each of the first and second reticulated surfaces 16 of the current collector 10 where the electrode material is intermixed with the current collector 10, and a region therebetween which comprises only current collector 10 without any electrode material. In embodiments where the current collector 10 and electrode 20 are fully fused or integrated together, the electrode material will be intermixed throughout the current collector 10, forming the strongest connection between the two components. The latter embodiment is depicted in FIG. 2B.

The reticulated and continuously porous structure of the current collector 10 of the present invention allows the current collector 10 to be enclosed and embedded or integrated within the electrode (as described above) without affecting the ionic pathway to the outer portions of the electrode 20. This is a dramatic improvement for the electronic pathway and ultimate conductivity of the electrochemical cells in which such current collector 10 and electrode 20 assemblies are employed, for the following reasons. First, the current collector 10 being positioned within the electrode 20 decreases the required diffusion distance for the electrons, from the current collector 10 to the outer reaches of the electrode 20 by about half. This in turn reduces the electronic conductivity requirement of the electrode 20 itself, which then reduces the amount of inactive electronic conducting fillers (such as carbon black) that is required, which otherwise consume volume. Secondly, the effective contact area between the current collector 10 and the electrode 20 can be considerably greater than just a thin metal film 18 without pores and reticulated surfaces because the structure enables contact with the electrode 20 on both sides of the current collector 10 (i.e., on both the first and second reticulated surfaces 16). Finally robustness of the electronic interface between the current collector 10 and the electrode 20 is improved for embodiments such as that shown in FIGS. 2A-2B because the current collector 10 is embedded within the electrode 20, thereby greatly reducing the propensity for the electrode 20 to delaminate from contact with the current collector 10 which otherwise results in increased electronic impedance.

Figures 3A, 3B, 3C, 4A, 4B:
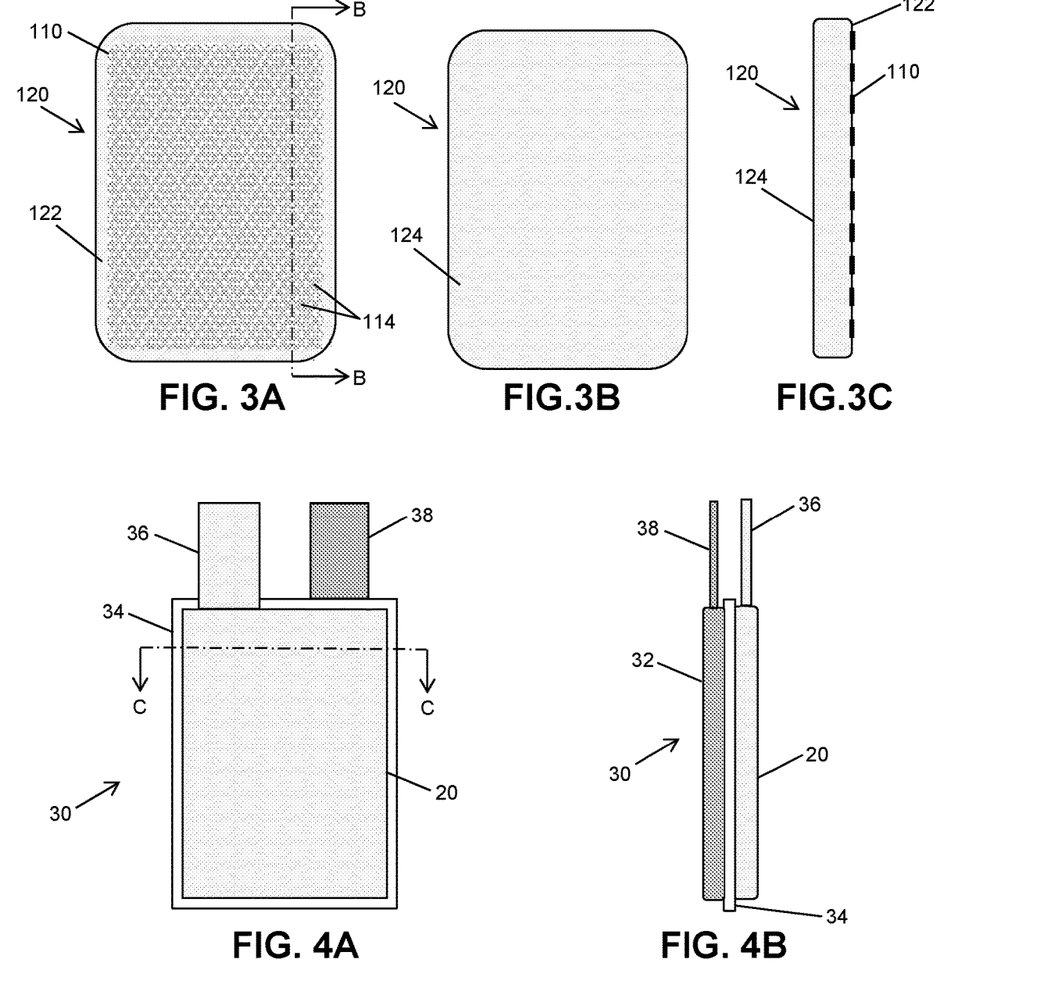
FIG. 3A is a schematic front view of another embodiment of an electrode which includes the current collector of FIG. 1.
FIG. 3B is a schematic rear view of the electrode of FIG. 3A.
FIG. 3C is a schematic cross-sectional left side view of the electrode of FIG. 3A, taken along line B-B and looking in the direction of the arrows, showing the position of the current collector with the electrode.
FIG. 4A is a schematic front view of an electrochemical cell stack which includes the current collector of FIG. 1.
FIG. 4B is a schematic left side view of the electrochemical cell stack of FIG. 4A.

Notwithstanding the foregoing technical advantages of the embodiment of the current collector 10 and electrode 20 assembly shown in FIGS. 2A-2B, other positional arrangements of the current collector 10 and electrode 20 are contemplated and expected to be suitable functional for use in electrochemical cells. As shown in FIGS. 3A-3C, instead of being positioned and integrated wholly within the electrode 20 as shown in FIGS. 2A-2B, a current collector 110 may alternatively, for example, be positioned adjacent to one side or surface of an electrode 120 and at least partially fused or integrated with that side of the electrode 120. More particularly, FIG. 3A shows a schematic front view of such an electrode 120, i.e., with the current collector 110 at least partially fused to a front surface 122 of the electrode. FIG. 3B provides the schematic rear view of this electrode 120 and its rear surface 124. FIG. 3C is a schematic cross-sectional left side view of the electrode of FIG. 3A, taken along line B-B and looking in the direction of the arrows, showing the position of the current collector 110 which is at least partially integrated with the front surface 122 of the electrode 120. Again, the current collector 110 and electrode 120 may be partially or fully integrated and fused together, such as by applying increased temperature and pressure sufficient to cause electrode material to enter and solidify at least partially in the pores 114 of the current collector 110.

Additionally, it is possible that, in some embodiments (not shown per se), a current collector and its associated electrode are simply in electrical contact with one another and not at all integrated or fused together. In such embodiments, the current collector may be positioned wholly within or only adjacent one surface of the electrode, such as shown in FIGS. 2B and 3C, respectively. These components may also be adhered to one another, i.e., using adhesive suitable for use with the polymer material of the porous core and metal of the thin metal film of the current collector, and with the electrode material of the electrode. Such adhesives are well known and understood by persons of ordinary skill in the relevant art and their selection is well within the ability of such persons. For example, such adhesives may comprise coatings made of acrylic resins, acid modified polyolefins (e.g., Acheson EB-20 commercially available from Henkel of Dussedorf, Germany), and acid modified polyvinylidene fluoride (PVDF) homopolymers and copolymers (e.g., Arkema ADX commercially available from Arkema of King of Prussia, Pa., U.S.A.). To improve electronic conductivity of the interface the aforementioned adhesives can be filled with electronically conductive agents such as carbon (represented by carbon blacks, graphene, carbon nanotubes, graphites) or metals. Thus, while it is preferred that the current collectors and their associated electrodes are integrated with one another, respectively, it is not required for use and operation of the current collectors contemplated and described herein.

As will be readily understood by persons of ordinary skill in the relevant art, materials suitable for making the electrode 20 will depend on the particular chemistry of the electrochemical cell in which it will later be used and whether the electrode 20 is a positive or negative electrode. It is well within the ability of persons of ordinary skill to select appropriate materials for the electrode 20 depending on its intended use. For example, where the electrode 20 will be a positive electrode in a lithium-based electrochemical cell, one or more of electrochemically active positive electrodes of intercalation compounds such as those based on $LiMeO_2$ (where Me=Co, Ni, Mn), $LiMn_2O_4$, $LiMn_{1.5}Ni_{0.5}O_4$, $LiMePO_4$ (where Me=Fe, Mn, No, Co), or conversion electrodes such as those based on $FeF_3$, $FeOF$, $FeF_2$, $BiF_3$, $NiF_2$, $CuF_2$, $CoF_2$, $MnF_3$ along with suitable binders such as those based on PVDF homo or copolymers, along with electronic conductive additives such as carbon black, graphite, graphene, and carbon nanotubes are suitable materials, without limitation. Similarly, suitable materials for a negative electrode in a lithium-based electrochemical cell include, without limitation, one or more of electrochemically active negative electrodes such as graphites, graphenes, hard carbon, coke, elements that alloy with Li such as Si, Sn, Ge, Al, and lithium metal along with suitable binders such as those based on PVDF homo or copolymers, along with electronic conductive additives such as carbon black, graphite, graphene, carbon nanotubes or metallic additives such as Ag, stainless steel, Cu or Ni.

The current collector 10 and associated electrode 20 are typically included in an electrochemical cell which will also typically include another current collector and associated electrode, a separator, tabs associated with each of the electrodes, an electrolyte and some type of packaging to contain all of the aforesaid functional components together and protect them from contact with the environment. The current collector 10 and associated electrode 20 will be either positive or negative. For purposes of the following discussion, the current collector 10 and associated electrode 20 will be described as being positive, with the other current collector and electrode pair being described as negative, though they could just as appropriately be oppositely described. Generally, when electrochemical cells are fabricated, an electrochemical stack is formed with the positive and negative electrodes, their associated current collectors and tabs, and a separator between the electrodes, and then the stack and electrolyte are enclosed within a packaging, which may be of various types, as are well known to persons of ordinary skill.

Figure 4C:
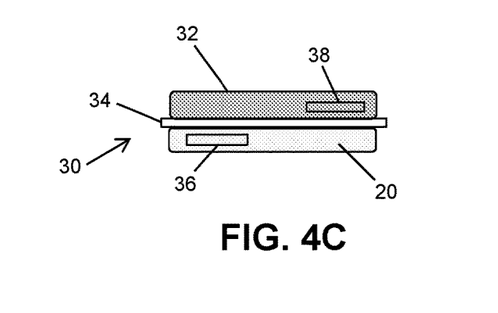
FIG. 4C is a schematic top view of the electrochemical cell stack of FIG. 4A.
Figure 4D:
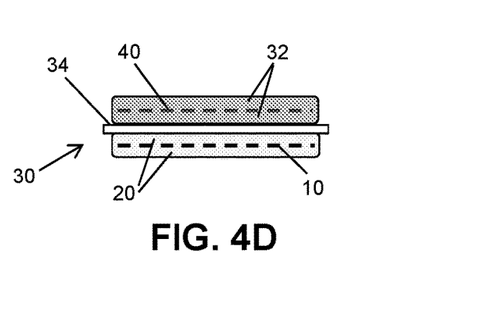
FIG. 4D is a schematic cross-sectional view of the electrochemical cell stack of FIG. 4A, taken along line C-C and looking in the direction of the arrows, showing the positions of current collectors integrated within the positive and negative electrodes.

With reference now to FIGS. 4A-4D, various schematic views of an electrochemical cell stack 30 are provided to show the various components thereof, as well as the position of the current collector 10 according to FIG. 1 therein. More particularly, FIGS. 4A, 4B and 4C provide schematic front, left side and top views, respectively, of a typical electrochemical cell stack 30 having positive and negative electrodes 20, 32, respectively, with a separator 34 therebetween. FIG. 4D provides a schematic cross-sectional view of the electrochemical cell stack of FIGS. 4A-4C, taken along line C-C and looking in the direction of the arrows. As shown in FIG. 4D, a positive current collector 10 is in contact with the positive electrode 20, and a negative current 40 collector is in contact with the negative electrode 32. More particularly, the positive and negative current collectors 10, 40 are shown in electrical contact with and fully integrated within each of their respective associated positive and negative electrodes 20, 32. As discussed hereinabove, in alternative embodiments, the positive and negative current collectors 10, 40 may be only partially integrated with each of their respective positive and negative electrodes 20, 32. Furthermore, while not shown in the figures, the positive and negative current collectors 10, 40 may be positioned adjacent to and in electrical contact with only one or the other surface of their respective associated electrodes 20, 32, as also previously described hereinabove. Additionally, the current collectors 10, 40 need not be integrated at all with their respective electrodes 20, 32, but merely in electronic contact with them, and even also adhered to them, as discussed above. For example, without limitation and although not shown per se, the positive current collector 10 may be positioned between and in contact with both the positive electrode 20 and the separator 34. All such embodiments and variations are contemplated herein and would constitute suitable and beneficial uses of the current collectors 10, 40 in accordance with the embodiments contemplated and described herein.

With reference back to FIGS. 4A-4C, the electrochemical cell stack 30 includes positive and negative tabs 36, 38, respectively. More particularly, the positive tab 36 is associated with the positive electrode 20 and is in electrically conductive contact with the positive current collector 20, while the negative tab 38 is associated with the negative electrode 32 and is in electrically conductive contact with the negative current collector 40. The tabs 36, 38 may be integrally formed with their respective positive and negative current collectors 10, 40, or they may be separately formed and then electrically connected to their respective positive and negative current collectors 10, 40. Where the tabs 36, 38 are separately formed and then attached to their respective positive and negative current collectors 10, 40, the attachment should be low electronic resistance. Both arrangements are well known to persons of ordinary skill in the relevant art. As is also known to such persons, the material used to form each tab 36, 38 is typically the same as that used to form the current collectors 10, 40 to which each is connected, respectively, but does not have to be as long as the tabs are at least as electrically conductive as the current collector 10, 40 to which each is connected. For example, whatever metal is selected and used to form the thin metal film 18 on at least one of the first and second reticulated surfaces of the current collector 10, 40 would be most beneficial material for also forming the tab 36, 38 connected to each respective current collector 10, 40 The production methods used to make many electrochemical cells and batteries, especially lithium pouch batteries, requires the tabs 36, 38 to be tolerant to high temperatures, for which the traditional metal current collectors were excellent. Now, the current collector 10 contemplated and described herein provides a beneficial alternative to the metal current collectors previously used since the tabs may still be made of metal while the porous core 12 of the current collector 10 may be made of a high temperature resistant polymer which will be able to withstand the production process employed to fabricate an electrochemical cell which includes the current collector 10.

While at least one exemplary embodiment has been presented in the foregoing detailed description, it should be appreciated that various additional embodiments and modification are possible that remain within the intent and function of the invention described and contemplated herein. It should also be appreciated that the exemplary embodiment or embodiments are merely examples, and are not intended to limit the scope, applicability, or configuration of the invention in any way. The foregoing detailed description provides those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

EXAMPLES

The following examples are provided as guidance and are not intended to limit the scope or suitable embodiments of the presently contemplated and described technology Example 1: Au Coated Polyimide Current Collector Polyimide films of 25 micron thickness widely available under the commercial name Kapton® were sputter coated with 500 nm of gold on both sides of the film to give a sheet resistance of approximately 0.055 Ohm square. A reticulate pattern comprising a diamond pore structure of open area 0.6885 mm$^2$ per pore, separated by grid of 255 micron width, to result in a structure of approximately 70% porosity was cut from the aforesaid coated polyimide substrate through the use of a 100 Watt (W) 1070 nanometer (nm) Yb-fiber laser (commercially available from SPI Lasers of Southampton, United Kingdom), through a telecentric lens with approximate spot size of 30 microns at 13.5% power level and a linear speed of 0.1 m/s.

Example 2: Ni Coated Polyimide Current Collector

Polyimide films of 25 micron thickness widely available under the commercial name Kapton™ were sputter coated with 700 nm of nickel on both sides of the film to give a sheet resistance of approximately 0.3 Ohm square. A reticulate pattern comprising a diamond pore structure of open area 0.6885 mm$^2$ per pore, separated by grid of 255 micron width, to result in a structure of approximately 70% porosity was cut from the coated polyimide substrate through the use of a 100 Watt (W) 1070 nanometer (nm) Yb-fiber laser (commercially available from SPI Lasers of Southampton, United Kingdom), through a telecentric lens with approximate spot size of 30 microns at 13.5% power level and a linear speed of 0.1 m/s.

Example 3: Li-Ion Battery Cell Incorporating Reticulated Current Collectors of Invention A. General Procedure This example demonstrates a method of fabrication of a laminated electrochemical cell. Such cells can be considered as an example of a generic lithium ion battery. Such an electrochemical cell can be represented by the so called "plastic technology" bonded batteries developed by Bellcore (J.-M. Tarascon, A. S. Gozdz, C. Schmutz, F. Shokoohi, and P. C. Warren, "Performance of Bellcore's Plastic Rechargeable Li-ion Battery", Solid State Ionics, 86-88, 49-54 (1996); A. DuPasquier, P. C. Warren, D. Culver, A. S. Gozdz, G. G. Amatucci, and J. M. Tarascon, "Plastic PVDF-HFP electrolyte laminates prepared by a phase inversion process" Solid State Ionics, 135, 249-257 (2000); A. DuPasquier, T. Zheng, G. G. Amatucci, and A. Gozdz, "Microstructure effects in plasticized electrodes based on PVDF-HFP for plastic Li-ion Batteries", J. Power Sorces, 97-98, 758-761, (2001)). The entire contents of each of the foresaid publications are incorporated herein by reference.

In general, a battery or an electrochemical capacitor cell stack utilizing such methodology is fabricated as follows. In Step 1, the layers, i.e, the positive and negative electrodes along with associated current collectors, and the porous separator, are bound together by heat and pressure. The positive and negative electrodes are composed of a mixture of the electrochemically "active" material along with a conductive carbon (carbon black) and a binder such as poly(vinylidenedifluoride-hexafluoropropylene) (PVdF-HFP) in a suitable solvent such as acetone or n-methyl pyrrolidinone along with a plasticizer such as dibutyl phthalate or propylene carbonate. For example, for a battery cell, the electrochemically "active" material includes, but is not limited to, LiCoO$_2$ and graphite for the positive and negative electrodes. Each electrode is cast and dried. A porous separator, made of a binder along with a high surface area filler (for e.g. fumed silica), a suitable plasticizer, and solvent, is also cast and dried. Alternatively a porous polyolefin separator with a PVDF-based adhesion layer may be utilized to create the bonded stack. Afterwards the plasticizer is extracted from the cell by means of liquid, thermal or gas phase extraction. The now bonded cell contains porosity. This porosity is infiltrated with a non aqueous liquid electrolyte and sealed within a multilaminate packaging.

B. Specific Example

Two lithium ion electrochemical cell stacks were fabricated as per the above-described methodologies of Example 3 and subsequently analyzed for performance. The two stacks are referred to hereinbelow as Cell 1 and Cell 2. Specifically, for each of Cell 1 and Cell 2, a positive electrode of 79.5 wt % LiCoO$_2$, 5.6 wt % PVDF-HFP copolymer (2801 Elf-Atochem), 1.3% carbon black (super P, MMM), 2.6 wt % KS6 (Timcal Corp.) and 11.1% propylene carbonate was dissolved in acetone, cast as an electrode and left to dry at room temperature. The negative electrode of MCMB 25/28 (Osaka Gas) is prepared in a similar fashion except 70.4 wt % MCMB 25/28, 6.9 wt % PVDF-HFP copolymer (2801 Elf-Atochem), 2.7% carbon black (super P, MMM), and 20.0% propylene carbonate was used as a formulation. $LiCoO_2$ cathodes were cut to 2.85×3.9 cm rectangles and MCMB anodes were cut to 3.0×4.0 cm. Electrode pieces were pre-densified at 125° C. and 20 psi. Incorporation of the reticulated current collectors described in Example 1 and Example 2 for the positive and negative electrode, respectively, was accomplished by first spraying the grids with EB-12 conductive coating (Acheson Corp.) to enhance adhesion to the electrodes and then embedding them within two pieces of electrodes by lamination at 125° C. and 30 psi. The electrodes were then laminated at 105° C. and 20 psi to a 3.6×4.6 $cm^2$ polyolefin porous separator (Celgard E903). The size of the cell enabled 0.243 g of positive electrode per cell stack with a 2.3 positive to negative electrode material weight matching ratio. The theoretical capacity of each cell was approximately 32 mAh. The propylene carbonate plasticizer was then extracted from the cell using dimethyl ether. The completed unit, identified as an electrochemical cell stack hereinafter, is the basic component of the electrochemical cell consisting of a positive electrode, a negative electrode, a porous separator, an electrolyte and a porous reticulated current collector of an embodiment of the invention for each electrode (see, e.g., FIGS. 4A-4D). A packaging was next applied to the electrochemical cell stack to prevent infiltration of moisture and oxygen. Surlyn adhesive strips were heat sealed to both sides of the coated polyimide tabs at 185° C. The cell was heat sealed inside an aluminum multilaminate packaging made for Li-ion batteries (DNP Corp.) packaged at 190° C. leaving an unsealed space for electrolyte incorporation. The dried packaged cell was then infiltrated with approximately 250 microliter of $LiPF_6$ 30 ethylene carbonate 70 ethyl methyl carbonate liquid electrolyte and the final seal was performed under the aforementioned conditions.

Example 4

Figure 5:
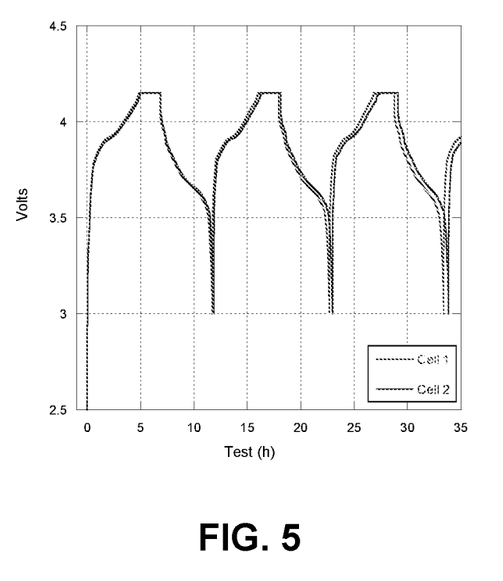
FIG. 5 is a graph showing the charge and discharge voltage profiles for sample Cells 1 and 2 prepared according to Example 3B.
Figure 6:
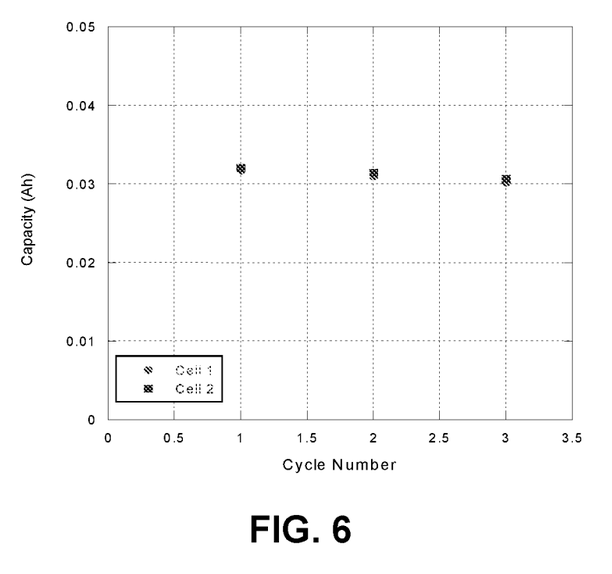
FIG. 6 is a graph showing Capacity vs. cycle number for a few cycles of sample Cells 1 and 2 prepared according to Example 3B.

Two cells (Cell 1 and Cell 2) of Example 3B were then evaluated electrochemically for their performance. Cells were charged at a rate of 6.4 mA to 4.2V. The voltage was then held at 4.2V until the current dissipated to 1.6 mA. The cells were then discharged at 6.4 mA. The first discharge of both cells were 31.7 and 32.1 mAh, respectively, which is in excellent agreement with the theoretical and designed capacity of 32 mAh. The first few charge and discharge voltage profiles for these cells are shown in FIG. 5. Capacity vs. cycle number for a few cycles is shown in FIG. 6 further demonstrating the porous reticulated current collectors of an embodiment of the invention are capable of supporting reversible battery performance. Also, of importance is to evaluate the degree to which capacity can be extracted from the cell at higher rates such at a current which would lead to a 1 h discharge. Both cells were discharged at a current of 32 mA. Cell 1 delivered 69% of its capacity and cell 2 delivered 72% of its capacity. This shows that the reticulated current collectors of this invention can enable a Li-ion battery to function properly and also deliver acceptable rate capability. Further optimization to thickness of the metallization and design of the reticulated structure can be used to further enhance the rate capability of the cell. It should be readily apparent that the incorporation of similar current collectors can afford other electrochemical devices of exceptional performance along with a multitude of new advantages.

We claim:

1. A current collector for use in an electrochemical cell comprising:
    a reticulated core comprising a polymer and having continuous porosity;
        wherein said polymer is one or more polymers selected from the group consisting of: polyolefin, polyimide, polyamide, poly(p-xylylene), silicone-containing polymer, poly (ethylene terephthalate), polyvinylidene fluoride, and copolymers thereof;
    a first reticulated surface;
    a second reticulated surface opposite said first reticulated surface; and
    a thin metal film disposed on at least one of said first and second reticulated surfaces, wherein said current collector has continuous porosity.

2. The current collector of claim 1, wherein said polymer is a high temperature resistant polymer.

3. The current collector of claim 2, wherein said polymer is one or more a high temperature resistant polymers selected from the group consisting of: polyimide, poly(p-xylylene), and copolymers thereof.

4. The current collector of claim 1, wherein said thin metal film is disposed on each of said first and second reticulated surfaces.

5. The current collector of claim 4, wherein a thickness of said thin metal film is in a range of about 25 nm to about 3,000 nm.

6. The current collector of claim 1, wherein said current collector is a positive current collector and said thin metal film comprises one or more materials selected from the group consisting of: C, Be, Al, Ti, V, Cr, Fe, Ni, Cu, Zn, Zr, Nb, Ta, W, Au, Pd, Pt, Mo, Ag, Cu, Ni, and Zn.

7. The current collector of claim 1, wherein said current collector is a negative current collector and said thin metal film comprises one or more metals selected from the group consisting of: Al, Ti, Au, Pd, Pt, Ag, Cu, Ni, and Zn.

8. The current collector of claim 1, wherein at least one of said first or second reticulated surfaces of the current collector has a surface porosity of from about 5 to about 80%.

9. The current collector of claim 8, wherein said either of said first or second reticulated surfaces of the current collector has a surface porosity of from about 25 to about 50%.

10. An electrode assembly comprising at least one of said current collector according to claim 1 and an electrode in contact with said current collector.

11. An electrochemical cell comprising at least one of said current collector according to claim 1.

12. The electrochemical cell of claim 11, further comprising an electrode and an electrolyte each of which comprises lithium or lithium ions.

13. A method for making the current collector of claim 1, comprising the steps of:
    providing a non-porous core comprising said polymer and having a first surface and a second surface opposite said first surface;
    depositing a thin metal film on at least one of said first or second surfaces of said non-porous core to form a metallized core substrate having first and second surfaces; and
    forming a plurality of pores in said metallized core substrate using a technique that creates said reticulated core having continuous porosity and converting the first and second surfaces of the metallized core substrate to the first and second reticulated surfaces, respectively, of the current collector.

14. The method of claim 13, wherein said technique is one or more processes selected from: computer controlled micro laser machining, high speed milling, water jet cutting, electrical discharge machining, and die cutting.

15. The method of claim 13, wherein said step of depositing said thin metal film is performed by one or more processes selected from: physical vapor deposition, plasma spray deposition and electrodeposition.

16. A method for making the current collector of claim 1, comprising the steps of:
providing said reticulated core which comprises said polymer and has continuous porosity, said first reticulated surface, and said second reticulated surface opposite said first reticulated surface; and
depositing said thin metal film on at least one of said first or second reticulated surfaces of said reticulated core to form said current collector.

17. The method of claim 16, wherein said step of depositing said thin metal film is performed by one or more processes selected from physical vapor deposition, plasma spray deposition and electrodeposition.

18. The method of claim 16, wherein said step of providing said reticulated core comprises the steps of:
providing a non-porous core comprising said polymer having a first surface and a second surface opposite said first surface; and
forming a plurality of pores in said non-porous core using a technique which forms said reticulated core having continuous porosity from said non-porous core, and converts said first and second surfaces of said non-porous core to said first and second reticulated surfaces, respectively, of said reticulated core.

19. The method of claim 18, wherein said technique is one or more processes selected from: computer controlled micro laser machining, high speed milling, water jet cutting, electrical discharge machining, and die cutting.

20. A method of making a current collector for use in an electrochemical cell, comprising the steps of:
providing a non-porous core including a polymer and having a first surface and a second surface opposite said first surface;
depositing a thin metal film on at least one of said first and second surfaces of said non-porous core to form a metallized core substrate having first and second surfaces; and
forming a plurality of pores in said metallized core substrate using a technique that creates a reticulated core having continuous porosity and converting the first and second surfaces of the metallized core substrate to first and second reticulated surfaces, respectively, of the current collector,
wherein the current collector includes said reticulated core and said polymer and having continuous porosity,
said first reticulated surface,
said second reticulated surface opposite said first reticulated surface, and
said thin metal film disposed on at least one of said first and second reticulated surfaces.

21. The method of claim 20, wherein said technique is one or more processes selected from: computer controlled micro laser machining, high speed milling, water jet cutting, electrical discharge machining, and die cutting.

22. The method of claim 20, wherein said step of depositing said thin metal film is performed by one or more processes selected from: physical vapor deposition, plasma spray deposition and electrodeposition.

23. A method of making a current collector for use in an electrochemical cell, comprising the steps of:
providing a non-porous core including a polymer and having a first surface and a second surface opposite said first surface;
depositing a thin metal film on at least one of said first and second surfaces of said non-porous core; and
forming a plurality of pores in said non-porous core using a technique which forms a reticulated core having continuous porosity from said non-porous core, and converts said first and second surfaces of said non-porous core to first and second reticulated surfaces, respectively, of said reticulated core,
wherein the current collector includes said reticulated core and said polymer and having continuous porosity,
said first reticulated surface,
said second reticulated surface opposite said first reticulated surface, and
said thin metal film disposed on at least one of said first and second reticulated surfaces.

24. The method of claim 23, wherein said technique is one or more processes selected from: computer controlled micro laser machining, high speed milling, water jet cutting, electrical discharge machining, and die cutting.

* * * * *